United States Patent [19]

Hasinger et al.

[11] 4,058,141

[45] Nov. 15, 1977

[54] SUPERSONIC FLOW DIFFUSER WITH ENERGY REDISTRIBUTION

[75] Inventors: Siegfried H. Hasinger; David K. Miller, both of Dayton, Ohio

[73] Assignee: The United States of America as represented by the Secretary of the Air Force, Washington, D.C.

[21] Appl. No.: 706,320

[22] Filed: July 19, 1976

Related U.S. Application Data

[63] Continuation-in-part of Ser. No. 606,378, Aug. 20, 1975, abandoned.

[51] Int. Cl.$^2$ .......................... F15D 1/06; B64D 33/02
[52] U.S. Cl. ...................................... 138/39; 137/15.1; 244/53 B
[58] Field of Search .................... 137/15.1; 138/37, 39, 138/40, 44; 244/53 B

[56] References Cited

U.S. PATENT DOCUMENTS

| | | | |
|---|---|---|---|
| 2,558,816 | 7/1951 | Bruynes | 138/37 |
| 2,589,945 | 3/1952 | Leduc | 244/53 B |
| 2,772,620 | 12/1956 | Ferri | 244/53 B |
| 2,971,331 | 2/1961 | Silverman et al. | 138/39 X |
| 3,710,889 | 1/1973 | Lamy | 137/15.1 |

*Primary Examiner*—Richard E. Aegerter
*Assistant Examiner*—Frederick R. Schmidt
*Attorney, Agent, or Firm*—Joseph E. Rusz; Richard J. Killoren

[57] ABSTRACT

A supersonic diffuser having a plurality of blades therein for dividing the diffuser channel into a plurality of approximately axisymmetric ducts wherein a portion of said ducts ingest a boundary layer along at least one of the walls of the supersonic diffuser. The blades in the diffuser channel have their upstream ends bent away from the wall having the boundary layer to redirect the flow into the ducts. In one embodiment the wall between the duct having the boundary layer and the duct adjacent to the duct having the boundary layer is made in two sections with both sections being bent away from the wall having the boundary layer, to provide internal redistribution between the two ducts.

6 Claims, 7 Drawing Figures

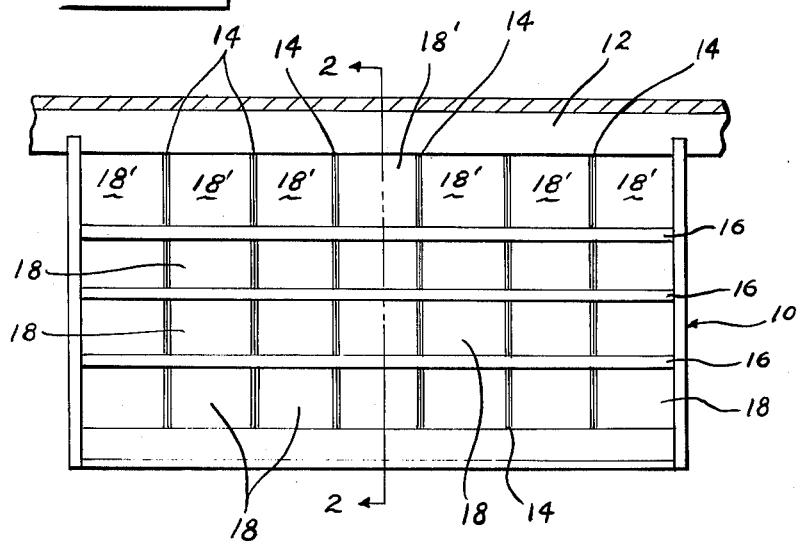
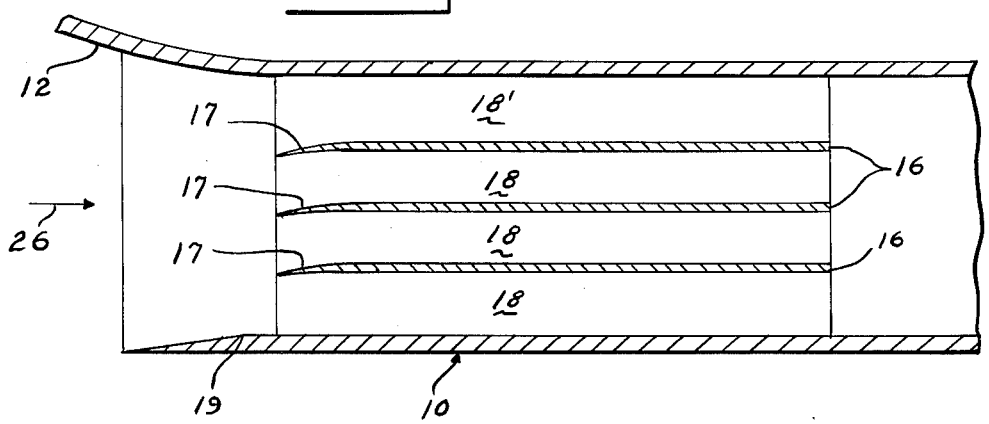
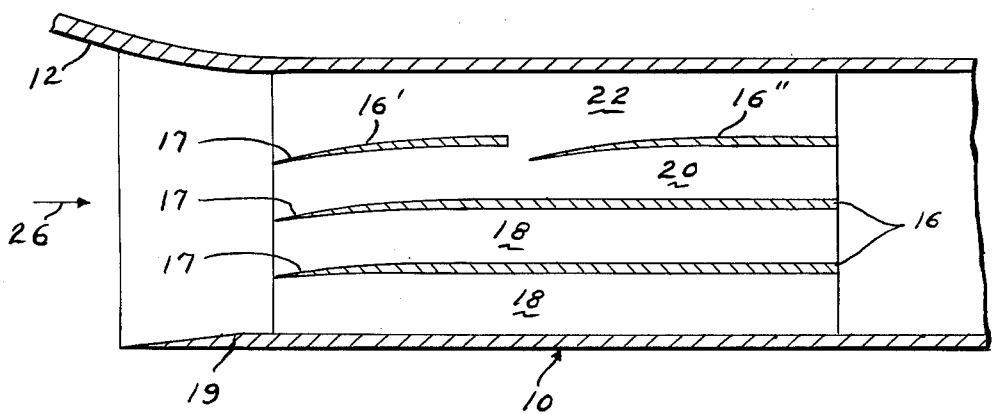

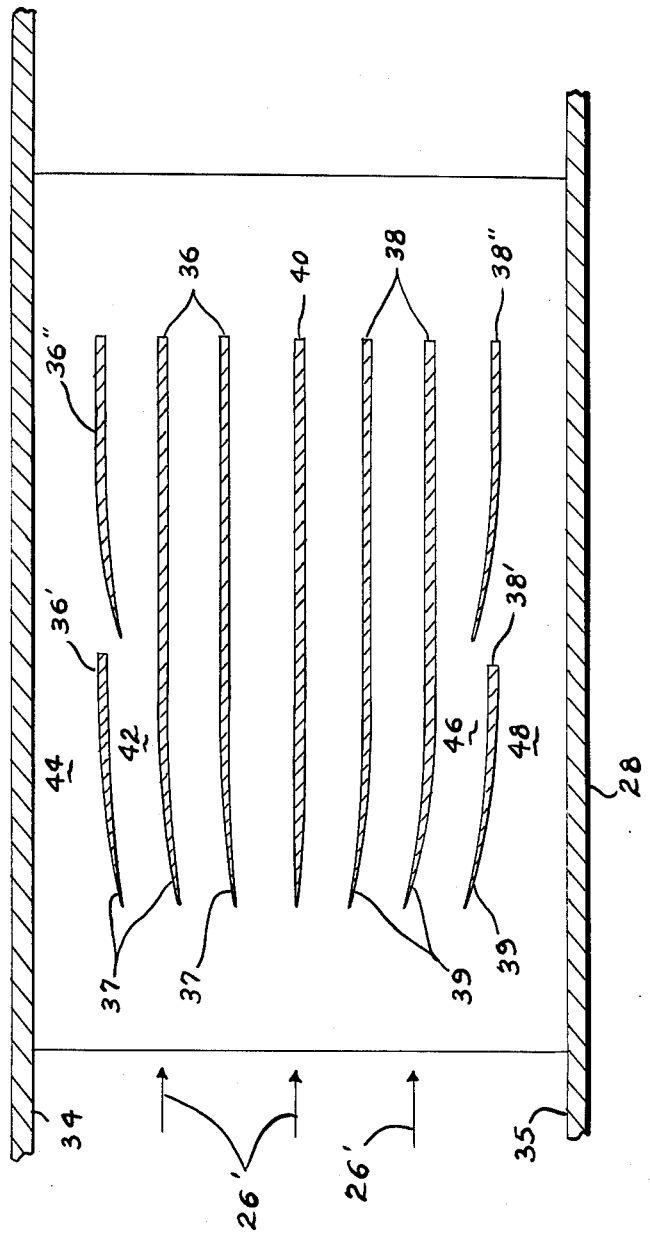

SUPERSONIC FLOW DIFFUSER WITH ENERGY REDISTRIBUTION

RIGHTS OF THE GOVERNMENT

The invention described herein may be manufactured and used by or for the Government of the United States for all governmental purposes without the payment of any royalty.

CROSS REFERENCE TO RELATED APPLICATION

This is a continuation-in-part of our application "Supersonic Flow Diffuser With Energy Redistribution", Ser. No. 606,378, filed Aug. 20, 1975, now abandoned.

BACKGROUND OF THE INVENTION

This invention relates to a supersonic diffuser with a non-axisymmetric design.

The design of supersonic diffusers, as used in supersonic wind tunnels is well understood. The flow mechanism primarily relied upon is the pseudo shock, which requires a duct length on the order of 10 duct diameters, to produce pressure recovery close to that of a normal supersonic shock. Blade systems have been used in prior art diffusers so that the length of the diffuser channel can be shortened. See the article "High-Efficiency Supersonic Diffusers" by Neumann and Lustwerk, pages 369–374, Journal of the Aeronautical Science, June 1951. Wind tunnel diffusers are normally close to an axisymmetrical design, that is, either round or square.

In diffuser channels which are not axisymmetrical, such as channels with a rectangular cross section of large side ratio, the pseudo-shock system suffers greatly with only about 65% of the normal shock recovery obtained.

Any diffuser channel, which is not axisymmetrical can be provided with a blade system which will divide the channel into ducts with approximately square cross sections which are substantially symmetrical around their own axis. Thus, while the blade systems were used in prior art devices only for the purpose of permitting the use of shorter channel length, they will also inherently perform the function of increasing the pressure recovery, when used in non-axisymmetrical channels. Though these blade systems increase wall friction, these losses are insignificant in comparison to the losses in the diffuser channel when they are not used.

In a diffuser channel wherein an internal blade system is used with a device having at least one wall extending forward of the diffuser channel, wherein the flow is directed into the diffuser channel with a certain flow distribution and with a boundary layer formed on the wall ahead of the diffuser channel, the diffuser duct, adjacent said one wall, are burdered by the boundary layer which is formed on the wall ahead of the diffuser and ingested into these ducts. It has been found that this greatly affects the pressure recovery of the diffuser.

SUMMARY OF THE INVENTION

According to this invention, a blade system is provided in a non-axisymmetrical supersonic diffuser. It has been found that flow energy redistribution within the ducts can overcome the adverse flow conditions associated with the ingestion of a boundary layer into the flow ducts along the wall which extends forward of a supersonic diffuser channel. These improved results are obtained when the upstream end of the blades are bent in a direction away from the wall having the boundary layer. It has been found that the best results are obtained when the blades closest to the wall have the greatest amount of bend with the amount of bending being decreased as the distance from this wall increases.

It has been found also that the pressure recovery can be further improved by providing internal energy redistribution in the diffuser channel. This is accomplished by providing an internal injection of flow from the duct next to the duct having the boundary layer into the duct having the boundary layer.

IN THE DRAWING

FIG. 1 is a front end view of a supersonic diffuser such as may be used with a ramjet engine.

FIG. 2 is a sectional view of the device of FIG. 1 along the line 2—2.

FIG. 3 shows a modified blade configuration for use with the device of FIG. 1.

FIG. 7 shows a modified blade configuration for use of the device of FIG. 4.

DETAILED DESCRIPTION OF THE INVENTION

Figure 4:
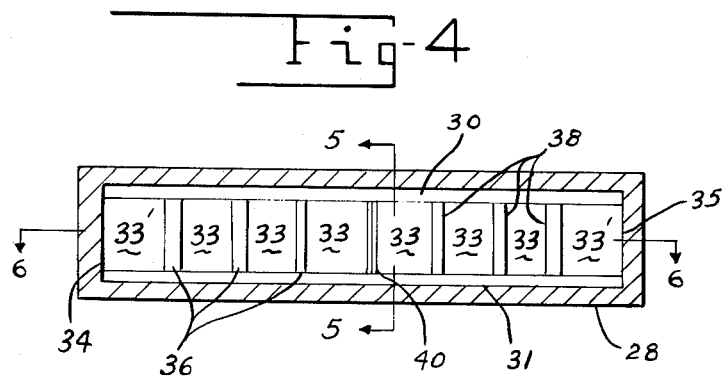
FIG. 4 is a front end view of a supersonic diffuser such as may be used in a laser.

Reference is now made to FIG. 1 of the drawing which shows a supersonic diffuser 10, such as may be used in the inlet of a ramjet engine, wherein a boundary layer is formed along wall 12. The diffuser 10 has a plurality of vertical blades 14 and a plurality of horizontal blades 16, which divide the diffuser channel into approximately square ducts 18. The blades 16 are bent away from the wall 12, as shown at 17, to redirect the flow in a direction toward the ducts 18' which ingest the boundary layer. The blades start behind the throat section 19 and stop a short distance from the end of the diffuser. The supersonic flow ahead of the throat section needs no energy redistribution and would be disturbed by the presence of blades.

It has been found in tests that the presence of the blades causes a pressure peak to occur in the duct next to the duct that carries the boundary layer and that the duct which carries the boundary layer has the lowest total pressure. The pressure recovery of the diffuser can be further improved as shown in FIG. 3. Internal redistribution between ducts 20 and 22 can be obtained by forming the wall between ducts 20 and 22 with the use of two blades 16' and 16''. The forward end of blade 16'' is also bent in a direction away from wall 12 to direct a portion of the flow from duct 20 into duct 22.

In the operation of the device of the invention, the supersonic flow enters the supersonic diffuser as shown by the flow lines 26. A boundary layer formed along the wall 12 is ingested into the ducts 18' of FIG. 2 or 22 of FIG. 3. The curved ends 17 of blades 16 redirect the flow entering the supersonic diffuser channel 10 in a direction toward wall 12. In the device of FIG. 3, the blade 16'' provides an internal redistribution of energy between ducts 20 and 22.

In some supersonic diffuser channels, such as are used with lasers, there may be boundary layer ingestion into the diffuser ducts along more than one wall, such as in the diffuser channel 28, as shown in FIG. 4. In this device, the boundary layers along walls 30 and 31 will have equal effects in all of the ducts 33. The boundary layers along walls 34 and 35, however, will enter only ducts 33'.

Figure 5:
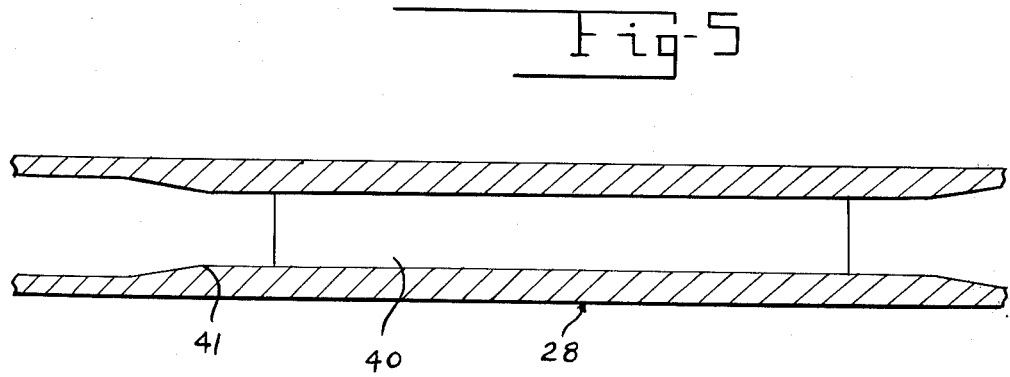
FIG. 5 is a sectional view of the device of FIG. 4 along the line 5—5.
Figure 6:
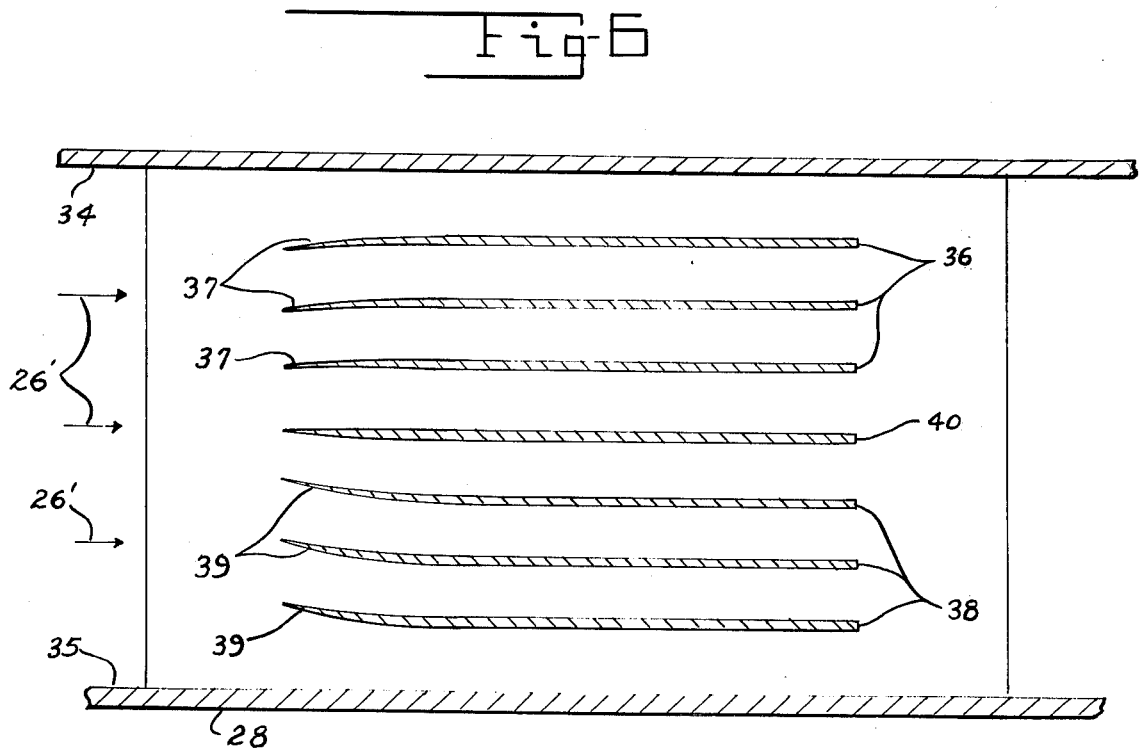
FIG. 6 is a sectional view of the device of FIG. 4 along the line 6—6.

In this device, blades 36 are bent away from wall 34 near the upstream end, as shown at 37, in FIG. 6. Blades 38 are bent away from wall 35 near the upstream end, as shown at 39. Blade 40, in the center of the diffuser channel 28, is straight. The blades in the device of FIG. 4 also start behind the throat section 41 as shown in FIG. 5.

This device can also be modified in the same manner as in the device of FIG. 3. Internal redistribution is provided as shown in FIG. 7. Blades 36' and 36" provide flow redistribution between ducts 42 and 44, and blades 38' and 38" provide flow redistribution between ducts 46 and 48 as in the device of FIG. 3.

While energy redistribution has been shown only between the duct next to the duct having the boundary layer and the duct having the boundary layer, for some applications flow redistribution between other ducts may be desirable.

For channels, as in FIG. 1, wherein boundary layers are present on all four walls, flow redistribution will be provided in both the horizontal and the vertical blade systems.

The flow redistribution system, of the invention, can be used in diffuser systems with configurations quite different than those shown.

There is thus provided an improved supersonic diffuser which provides improved pressure recovery in non-axisymmetric channels.

We claim:

1. A supersonic diffuser, comprising: at least four walls forming a non-axisymmetric diffuser flow channel; means forming a converging inlet and throat section in said channel; a wall extending forward of the flow channel and forming a continuous surface together with one wall of said flow channel; whereby in response to a flow of air along said continuous surface and into the diffuser flow channel a boundary layer forms along the wall extending forward of the flow channel and enters the diffuser flow channel; a plurality of blade members positioned within the diffuser channel downstream of the throat section; said blade members dividing the flow channel into a plurality of flow ducts which are substantially symmetrical around their own axis; means, on at least a portion of said plurality of blade members, for redirecting the flow in the diffuser channel in a direction toward the wall of said flow channel, which forms the continuous surface with the wall which extends forward of the flow channel.

2. The device as recited in claim 1 wherein the means for redirecting the flow in the diffuser channel includes portions of the blades at the upstream end of the flow channel bent in a direction away from the wall which extends forward of the flow channel.

3. The device as recited in claim 2 including means, within the diffuser flow channel, for providing an internal redistribution of energy between the ducts in said diffuser channel.

4. The device as recited in claim 3 wherein said means for providing an internal redistribution of energy between the ducts in said diffuser channel includes means for directing a flow of air from the duct next to the duct adjacent the diffuser flow channel wall having the boundary layer into the duct adjacent the diffuser flow channel wall having the boundary layer to thereby transfer energy from the duct, next to the duct adjacent the diffuser flow channel wall having the boundary layer, into the duct, adjacent the diffuser flow channel wall having the boundary layer.

5. The device as recited in claim 2 wherein said supersonic diffuser is positioned within a flow channel; four walls extending forward of the supersonic diffuser and forming continuous surfaces with the walls of the flow channel; said four walls being adapted to have boundary layers formed along the continuous surfaces in response to flow of air along the continuous surfaces and into the diffuse flow channel; with the boundary layer on a first two opposite walls each entering all of the flow ducts; and the boundary layer on a second two opposite walls, each entering only one of said ducts; said diffuser channel having a straight central blade with the blades on one side of said central blade being bent in a direction away from the wall on the corresponding side of said central blades and the blades on the other side of said central blade being bent in a direction away from the wall on that side of the central blade.

6. The device as recited in claim 5 including means, within the diffuser flow channel, for providing an internal redistribution of energy between the ducts next to the ducts adjacent to the second two opposite walls and the ducts adjacent the second two opposite walls.

* * * * *